Feb. 21, 1967  J. REMOLEUR  3,305,452
FALL-DAMPING DEVICE FOR A NUCLEAR REACTOR
Filed July 8, 1965  2 Sheets-Sheet 1

United States Patent Office 3,305,452
Patented Feb. 21, 1967

3,305,452
FALL-DAMPING DEVICE FOR A NUCLEAR REACTOR
Jacques Remoleur, Gif-sur-Yvette, France, assignor to Commissariat à l'Energie Atomique, Paris, France
Filed July 8, 1965, Ser. No. 470,541
Claims priority, application France, July 24, 1964, 982,848
8 Claims. (Cl. 176—87)

This invention is concerned with devices for damping falling motion and has for its object a device of this type which can be employed in a nuclear reactor with vertical channels and downflowing coolant for the purpose of absorbing the kinetic energy of fuel elements which fall freely within a fuel channel.

Absorption of the kinetic energy acquired by a fuel element when accidentally released by a handling grab within a vertical fuel channel gives rise to an acute problem in reactors of the types which are at present contemplated, in which the circulation of coolant gas takes place in a downward direction. In point of fact, whereas the fall of the fuel element is damped by the gas flow in the case of upward circulation of the coolant, the fuel element is subjected to considerable additional acceleration when the coolant flows in the opposite direction.

For example, in a reactor of this type in which the fuel elements rest on support discs secured to graphite sleeves which are stacked one above the other within the fuel channel, and considering the case of a loading accident which results in unlocking of the handling grab and unhooking of the sleeve, the fuel element is violently projected downwards and acquires a sufficient velocity to result in the rupture of the fuel element support grid when the sleeve comes into contact with the supporting shoulder formed on the lowermost dummy fuel element which is usually provided. The fuel element is then alone projected into the collector which is known as a "catchpot" and which is designed to receive graphite debris (or even accidentally released fuel elements).

The debris collector referred to has a cylindrical shape, is formed of a rigid material such as stainless steel, and is provided with slots for the passage of the coolant gas. The arrival of a fuel element within this debris collector is liable to result in its rupture or at least, if the coolant slots are vertical, in deformation resulting in a reduction in the gas flow rate within the channel and consequently a reduction in cooling.

The present invention is especially intended to avoid these disadvantages. To this end, the invention proposes a device comprising at least one closed deformable container filled with a "cushion" of powdered moderator material (preferably graphite) and placed within the fuel channel on the path of the fuel element.

When a fuel channel is provided with a debris collector which is removably fixed to the bottom of said channel, said container is placed at the bottom of the collector and the openings provided for the flow of coolant through the debris collector are formed above the top face of the container.

The damping device which has just been defined does not completely eliminate all danger of deformation of the debris collector. Consequently, it is preferable either to complete said collector with a special catchpot suspension device which is designed to provide additional shock-absorption, or to replace the conventional vertical slots by horizontal slots. Accordingly, in the event of plastic deformation of the debris collector, these slots remain open and thus permit the flow of heat-transporting gas.

The invention also consists in a certain number of arrangements which can advantageously be employed in conjunction with those mentioned heretofore but which can also be employed independently thereof. A better understanding of the invention will be gained from a perusal of the description which now follows below, reference being made to the accompanying drawings in which a number of forms of embodiment of the invention are shown by way of example without any limitation being implied.

Figure 2:
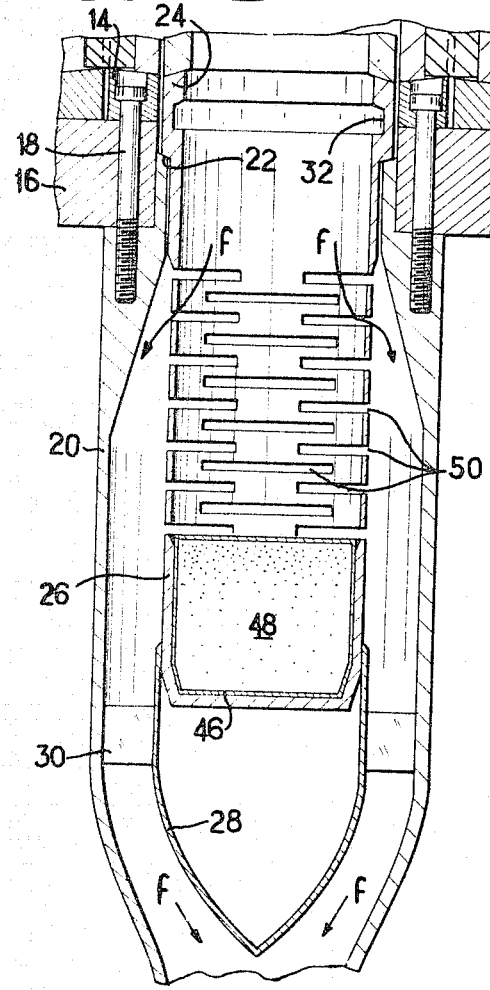
FIGS. 2 and 3 are views in longitudinal cross-section of two devices which constitute alternative forms of the device of FIG. 1.
Figure 2:
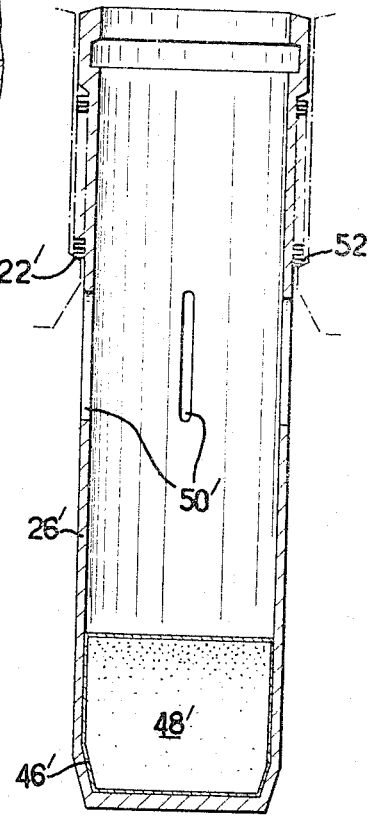
Figure 4:
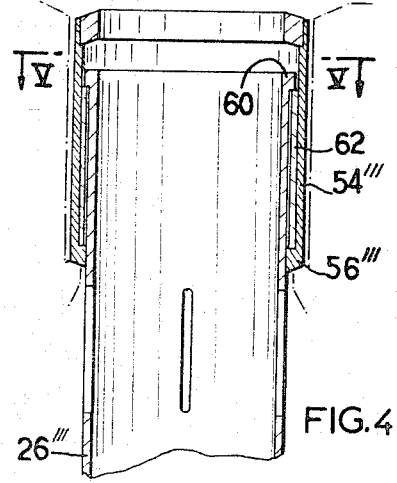
Figure 5:
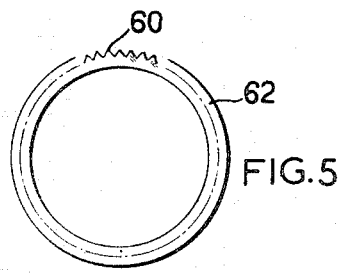
Figure 3:
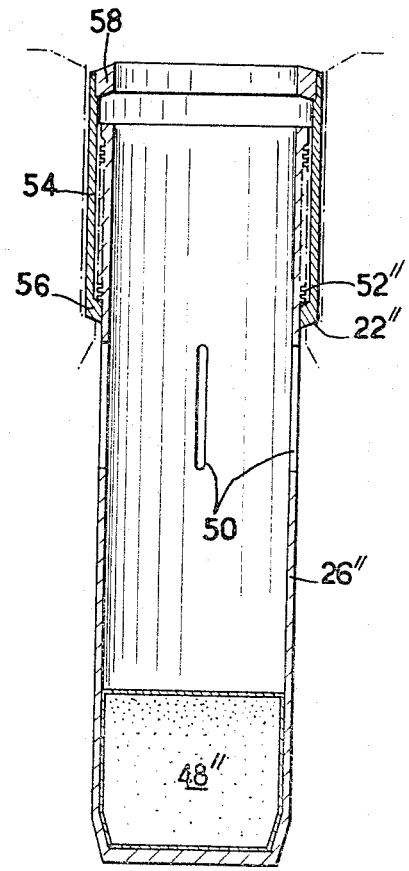
Figure 6:
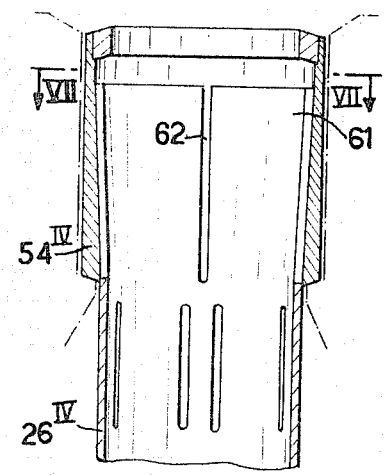
Figure 7:
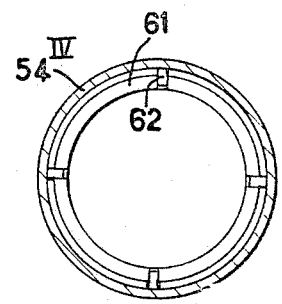

FIGS. 4 and 6, which are similar to FIGS. 2 and 3, show the top portion of two devices which constitute two further alternative forms of the invention;

FIGS. 5 and 7 are transverse cross-sections respectively along the line V—V of FIG. 4 and along the line VII—VII of FIG. 6.

Figure 1:
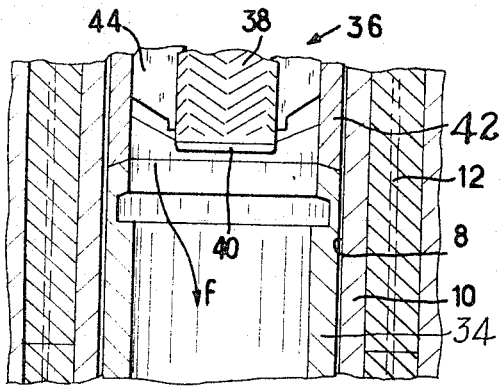
FIG. 1 is a longitudinal sectional view of the bottom portion of a nuclear reactor channel fitted with a device in accordance with the invention.

FIG. 1 shows the bottom portion of a vertical nuclear-reactor channel 8 through which a coolant gas is circulated in the downward direction. Each channel 8 is formed by the juxtaposition of bores formed within a column of moderator bricks such as 10 which are joined to the bricks of adjacent columns by means of longitudinal keys such as the key 12. Each column of moderator is carried by an annular bearing 14 on a support plate 16. There is secured to said support plate, for example by means of bolts such as the bolt 18 which also retain the annular bearing 14, the inlet cone 20 for conveying the heat-transporting gas to a utilization loop which consists, for example, of heat exchangers.

The cone 20 is provided at the top with an annular shoulder 22 on which rests the underface of a boss 24 of the debris collector 26 which will be referred to hereinafter as a "catchpot." Said catchpot 26 is centered within the cone 20 by engagement of the terminal portion thereof within a stationary casing 28 which is rigidly fixed to the cone 20 by means of fins 30. A groove 32 formed at the top of the catchpot 26 makes it possible to grip this latter by means of a fuel element handling grab (not shown), then to withdraw said catchpot and replace it if necessary by another.

The reactor channel 8 contains a stack of fuel elements, the lowermost fuel element of which consists of a dummy element 34. Said dummy element consists of a graphite sleeve having an external diameter which is slightly smaller than that of the channel and which, when in position, rests on the top face of the boss 24. The lowermost fuel element 36 rests on said dummy element and consists of a fuel element proper 38 carried by a support disc 40 which is attached to a sleeve 42 and centered in this latter by splitters 44.

The complete arrangement mentioned thus far is conventional and will therefore not be described further.

The device according to the invention as illustrated in FIG. 1 consists of a thin-walled container 46 formed of a material such as stainless steel, for example, which has sufficient rigidity and strength to prevent deformation during handling, said container having a generally cylindrical shape and filled with a powdered product 48. As will be apparent, said product must have satisfactory neutronic properties; powdered graphite, which has a low neutron-capture cross-section and does not become radioactive, constitutes the most advantageous material in the majority of cases. The container 46 has a diameter and a shape at the bottom which correspond to those of the catchpot 26.

In the form of embodiment which is illustrated in FIG. 1, wherein the catchpot 26 is rigidly secured to the channel, the kinetic energy acquired by a fuel element when this latter falls may not be completely absorbed by the deformation of the container 46. For this reason, the slots 50 which are provided for the flow of coolant gas are horizontal. Thus, any deformation in the direction of extension of the catchpot will accordingly tend to enlarge these slots and therefore to increase the coolant flow in the fuel channel (instead of reducing the cooling action as would be the case with vertical slots) along the path indicated by the arrows $f$.

The need for horizontal slots can be avoided if the damping action of the container 46 is completed by a connecting structure between the catchpot and the channel which takes part in said damping action. Such connecting structures are illustrated in the forms of embodiment of FIGS. 2 to 7, which offer the additional advantage of limiting or even eliminating any deformation of the catchpot which could give rise to difficulty in withdrawing and replacing this latter after it has sustained damage.

The device of FIG. 2, wherein the parts corresponding to those of FIG. 1 are designated by the same reference numerals with a prime mark affixed thereto, comprises a catchpot 26′ within which is fitted a container 48′. A series of shearing washers such as the washer 52 are arranged on the lateral wall of the catchpot below the boss 24. The lowermost shearing washer rests on the annular shoulder 22′ of the cone. When a fuel element falls into the catchpot, one or a number of the washers 52 shear and thus absorb the kinetic energy of the dropped fuel element. This arrangement makes it possible to retain vertical slots 50′ for the passage of coolant gas.

FIG. 3, in which the parts already illustrated bear the same reference numerals followed by the second index, shows an alternative form of embodiment of FIG. 2. The shearing washers 52″ no longer rest directly on the annular shoulder 22″ but on an intermediate annular member 54 which is placed between the catchpot and the support plate and presents a bottom flange 56 which is interposed between the washer 52″ and the annular shoulder 22″. A ring 58 which is fitted by screwing to the top extremity of the intermediate member 54 provides an annular shoulder for the engagement of the fuel element handling grab. Consequently, it is not necessary to provide an internal groove for this purpose in the catchpot wall.

The alternative form which is shown in FIG. 3 makes it possible to prevent any jamming of sheared washers within the fuel channel since the catchpot 26″ and intermediate member 54 are removed simultaneously and contain the washers.

FIGS. 4 and 5 show another alternative form in which the damping by means of the device for fixing the catchpot is no longer produced by shearing of washers but by scoring of an element which is formed of soft material. Provision is made at the top of the catchpot 26‴ for a ring 60 of axial teeth which rests on a bushing 62 of soft material (graphite, for example). The bushing 62 in turn rests on a flange 56‴ formed by an intermediate member 54‴ which is similar to the member 54 of FIG. 3. In the event of impact, the teeth 60 penetrate into the graphite bushing 62, thus damping the impact.

FIGS. 6 and 7 show yet another alternative form in which the damping by means of the device for fixing the catchpot $26^{IV}$ is produced by deformation without rupture of the top portion of the catchpot. Said top portion is formed by a skirt 61 of frusto-conical shape with a slight conicity or taper, in which are formed a number of slots such as the slot 62 which are vertical and uniformly spaced angularly. In the event of excess impact, the sleeve is driven into the intermediate member $54^{IV}$, thus closing up the slots 62 as a result of compression of the skirt 61.

Other forms of embodiment would of course be possible. Furthermore, it is self-evident that the container which is filled with powdered material and which produces the main damping action could be replaced by a number of containers of smaller thickness and placed one above the other so as to provide the requisite thickness: This arrangement offers an advantage in that it prevents the localization of the impact. It will be readily apparent that this alternative form as well as, in a more general sense, any alternative form of all or a part of the arrangements hereinabove described which remains within the definition of equivalent mechanical means is included in the scope of this patent.

What I claim is:

1. A fall-damping device for a nuclear reactor comprising a closed and deformable container filled with powdered moderator material and supported by the bottom of a debris collector retained in a vertical fuel channel, said collector being provided with openings for the passage of coolant formed in the wall of said debris collector above the top face of said container.

2. Device in accordance with claim 1, wherein the openings formed in said debris collector consist of slots of which the longest dimension is horizontal.

3. Device in accordance with claim 1, wherein the debris collector is secured to the fuel channel by a plurality of serially-disposed shearable elements carried by said debris collector, the lowermost element being in abutment with an annular shoulder which forms part of the channel wall.

4. Device in accordance with claim 3, wherein said annular shoulder is formed on an intermediate member which can be withdrawn from the fuel channel.

5. Device in accordance with claim 1, wherein the debris collector is secured to the fuel channel by members carried by said debris collector and bearing against a sleeve of soft material which is fixed to the channel wall, said members moving longitudinally of said sleeve and scoring grooves in said soft material.

6. Device in accordance with claim 1, wherein the debris collector is secured to the fuel channel by means of an element which is carried by said debris collector and applied against an element which is secured to the channel wall, the elements being such that said debris collector is capable of moving axially with respect to the channel under the impact of a fuel element as a result of deformation of at least one of said elements.

7. Device in accordance with claim 1, wherein the debris collector is provided with means whereby a handling grab can be hooked-on for withdrawing said collector from the fuel channel.

8. A nuclear reactor having fuel elements comprising a graphite sleeve and a clad fuel rod supported in and by said sleeve, said fuel elements being stacked in vertical fuel channels with the sleeves in abutment, a device for damping the fall of a fuel rod upon fracture of the connection between said fuel rod and the associated sleeve comprising a closed and deformable container filled with powdered graphite and means for supporting said cushion removably connected to the lower end of the fuel channel.

References Cited by the Examiner

UNITED STATES PATENTS

| | | |
|---|---|---|
| 2,732,040 | 1/1956 | De Vost et al. |
| 2,877,170 | 3/1959 | Greenhalgh et al. _ _ _ _ _ 176—87 |

FOREIGN PATENTS

| | | |
|---|---|---|
| 1,296,086 | 5/1962 | France. |

REUBEN EPSTEIN, *Primary Examiner.*